Dec. 4, 1928.
A. I. LIBERMAN
1,694,271
COMBINED BACK FIRE AND THEFT PREVENTING DEVICE
Filed May 18, 1927
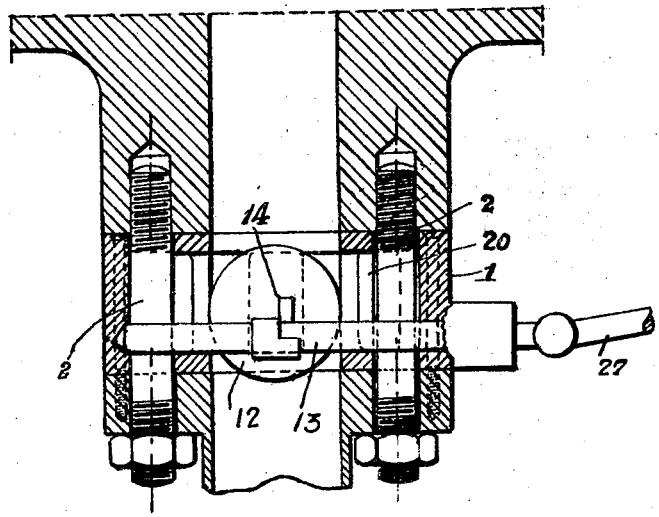
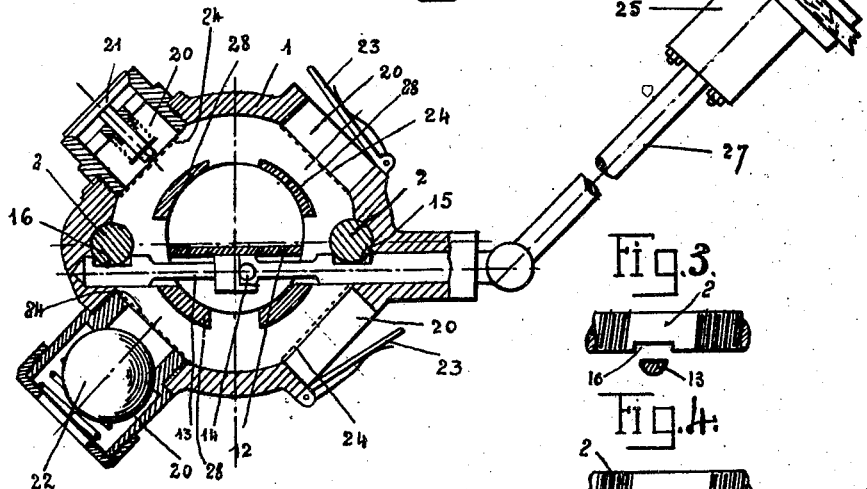
Inventor
Alexander I. Liberman Patented Dec. 4, 1928.

1,694,271

UNITED STATES PATENT OFFICE.

ALEXANDER IEZEKIL LIBERMAN, OF BOULOGNE, FRANCE.

COMBINED BACK FIRE AND THEFT PREVENTING DEVICE.

Application filed May 18, 1927, Serial No. 192,459, and in France December 11, 1926.

The present invention relates to a back fire and theft preventing device for automobile vehicles, when the engines of these vehicles are of the internal combustion type.

The device comprises an obturating member, such as a flap valve, mounted in the induction pipe of the engine and opening towards the engine, in combination with a lock located in such manner as to block the obturating member in its closed position.

When the obturating member is constituted by a flap valve, this flap valve oscillates freely about a spindle eccentric to the center of the flap valve, so that the flap valve tends to close the induction pipe by its own weight. The consequence of a back-fire is to tilt the flap valve and close the induction pipe.

Port holes are formed in the wall of the induction pipe, between the obturating member and the engine, to enable the back-fire gases to escape into the atmosphere, and these port holes are each sealed by an arresting member such as a valve, ball or flap-valve opening towards the exterior of the induction pipe. A wire gauze is located within each port hole to arrest the flame before it leaves the apparatus.

According to one embodiment of the invention, the obturating member and the arresting members may be mounted on a flange inserted in the induction pipe.

When the obturating member is constituted by a flap-valve the spindle of this latter is actuated by the lock and has a lug which, when the spindle is rotated under the action of the lock, comes into contact with the flap valve and closes it.

For greater security, the obturating member may be protected against access thereto through the exhaust ports, by providing opposite these latter and around the obturating member, solid shields which may be integral with the body of the device.

The lock may either be mounted directly on the apparatus, or on the dash-board, in which case it is connected to the locking spindle by any suitable means of control.

The invention has been represented diagrammatically and by way of example in the appended drawing in which:

Fig. 1 is a sectional plan view of the flap valve device.

Fig. 2 is a vertical axial section of the device shown in Fig. 1.

Figs. 3 and 4 are detail views.

The obturating member is constituted by a flap valve 12 loosely mounted on the spindle 13 so that the action of the induced gases and back-fires on the flap valve is to tilt it without causing the spindle to rotate. This spindle 13 is at one side of the center of gravity of the flap valve; so that the valve 12 normally tends to obturate the induction pipe under the action of its weight. During the suction stroke, the gases drawn in lift the valve. If a back-fire occurs, the exhaust gases act on the inner face of the valve 12 and close the induction pipe. They escape through openings 20 in the wall of the induction pipe.

A lug 14 is fixed to the spindle 13 within the induction pipe, the object of which is to bear against the valve (if it is in the open position) and to close it when the spindle is rotated through an angle of about 90° by means of the lock 25. The valve 12 will thus be kept closed by the lug 14 and it will be impossible for the gases to be drawn into the engine.

When the device is mounted on a removable flange, the said spindle 13 may, at the same time as it closes the valve, come into engagement with the studs 2 by means of which such flange is secured so as to prevent the studs from being removed while the spindle 13 holds the valve 12 in closed position. To this end, a notch 15 is cut in the periphery of the spindle 13, and a notch 16 is made opposite it in the periphery of one of the fixing studs 2. These notches are so arranged that, at the same time that the spindle is partially rotated to cause the lug 14 to close the valve 12, the notch 15 of the spindle 13 comes into engagement with the notch 16 of the fixing stud 2 (Fig. 4) and thus prevents the flange 1 from being removed or dismounted as shown in Fig. 4.

The ports 20 may be formed in the induction pipe, between the obturating member and the engine, in order to let the back-fire gases exhaust to the atmosphere. These ports 20 are each closed by an arresting member such as a poppet valve 21, a ball valve 22 or flap valve 23 opening outwards. A wire gauze 24, located within each port arrests the flames before they issue from the apparatus.

As a means to greater security the obturating member can be protected against access thereto through the exhaust ports 20, by providing solid shields 28 in the induction pipe opposite said ports and around the obturating member, and which may be integral with the body of the device.

The lock 25 of any suitable form, which actuates the spindle, may be mounted either directly on the apparatus, or on the dashboard 26 (Fig. 1), in which case it is connected to the locking spindle by any suitable means of control; this means of control is represented by a rod 27 and a universal joint in Fig. 1.

It is moreover evident that the invention has only been described and represented here in a purely explanatory and by no means limitary manner and that it might be subjected to various modifications without altering the spirit thereof.

I claim:

1. A combined theft and back-fire preventing device located in the induction pipe of an internal combustion engine comprising an obturating member located in said induction pipe and opening towards said engine, a lock, and means actuated by said lock for maintaining said obturating member in closed position.

2. A combined theft and back-fire preventing device located in the induction pipe of an internal combustion engine comprising an obturating member located in said induction pipe and opening towards said engine, said obturating member being pivoted about an axis offset from its center of gravity, a lock, and means actuated by said lock for maintaining said obturating member in closed position.

3. A combined theft and back-fire preventing device located in the induction pipe of an internal combustion engine comprising an obturating member located in said induction pipe and opening towards said engine, a spindle on which said obturating member is loosely mounted in unstable equilibrium, a lock, connecting means between said spindle and said lock and a projection on said spindle adapted to abut against said obturating member.

4. A combined theft and back-fire preventing device located in the induction pipe of an internal combustion engine comprising an obturating member located in said induction pipe and opening towards said engine, a lock, and means actuated by said lock for maintaining said obturating member in closed position, said induction pipe having openings for evacuating the back-fire gases.

5. A combined theft and back-fire preventing device located in the induction pipe of an internal combustion engine comprising an obturating member located in said induction pipe and opening towards said engine, a spindle on which said obturating member is loosely mounted in unstable equilibrium, a lock, connecting means between said spindle and said lock, and a projection on said spindle adapted to abut against said obturating member, said induction pipe having openings for evacuating the back-fire gases.

6. A combined theft and back-fire preventing device located in the induction pipe of an internal combustion engine comprising an obturating member located in said induction pipe and openings towards said engine, a spindle on which said obturating member is loosely mounted in unstable equilibrium, a lock, connecting means between said spindle and said lock, a projection on said spindle adapted to abut against said obturating member, said induction pipe having openings for evacuating the back-fire gases, and means normally closing said opening and yielding to the pressure of the back-fire gases.

7. A combined theft and back-fire preventing device located in the induction pipe of an internal combustion engine comprising an obturating member located in said induction pipe and opening towards said engine, a spindle on which said obturating member is loosely mounted in unstable equilibrium, a lock, connecting means between said spindle and said lock, fixing bolts for securing said device in position, a lug on said spindle adapted to abut against said obturating member, said spindle and one of said bolts having notches in their peripheries adapted to interengage when said spindle is partially rotated to cause said lug to abut against said obturating member.

8. A combined theft and back-fire preventing device located in the induction pipe of an internal combustion engine comprising an obturating member located in said induction pipe and opening towards said engine, a spindle on which said obturating member is loosely mounted in unstable equilibrium, a lock, connecting means between said spindle and said lock, a projection on said spindle adapted to abut against and close said obturating member, said induction pipe having openings for evacuating the back-fire gases, means normally closing said openings and yielding to the pressure of the back-fire gases, wire gauzes in said openings for arresting the flames from said back-fire gases.

9. A combined theft and back-fire preventing device located in the induction pipe of an internal combustion engine comprising an obturating member located in said induction pipe and opening towards said engine, a spindle on which said obturating member is loosely mounted in unstable equilibrium, a lock, connecting means between said spindle and said lock, a projection on said spindle adapted to abut against and close said obturating member, said induction pipe having openings for evacuating the back-fire gases, and solid shields in said induction pipe opposite said openings and surrounding said obturating member.

10. A combined theft and back-fire preventing device located in the induction pipe of an internal combustion engine comprising an obturating member located in said induction pipe and opening towards said engine, a spindle on which said obturating member is loosely mounted in unstable equilibrium, a lock, a transmission shaft between said spindle and said lock and a projection on said spindle adapted to abut against said obturating member.

ALEXANDER IEZEKIL LIBERMAN.